United States Patent
Abe (10) Patent No.: US 7,253,936 B2
(45) Date of Patent: Aug. 7, 2007

(54) LASER SCANNING UNIT

(75) Inventor: Masaaki Abe, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/088,923

(22) Filed: Mar. 25, 2005

(65) Prior Publication Data
US 2005/0213177 A1 Sep. 29, 2005

(30) Foreign Application Priority Data
Mar. 26, 2004 (JP) ............................. 2004-093258
Sep. 22, 2004 (KR) ...................... 10-2004-0075971

(51) Int. Cl.
*G02B 26/08* (2006.01)
(52) U.S. Cl. ...................................... 359/204; 359/206
(58) Field of Classification Search ................ 359/196, 359/197, 198, 199, 200–226, 819, 820
See application file for complete search history.

(56) References Cited

U.S. PATENT DOCUMENTS 6,118,570 A * 9/2000 Kanai et al. ................. 359/210
6,347,003 B1 * 2/2002 Shiraishi et al. ............ 359/204
6,462,882 B2 * 10/2002 Chen et al. .................. 359/631

FOREIGN PATENT DOCUMENTS

| JP | 01-169422 | 7/1989 |
|---|---|---|
| JP | 03-073909 | 3/1991 |
| JP | 03-179420 | 8/1991 |
| JP | 07-111501 | 4/1995 |
| JP | 07-140404 | 6/1995 |
| JP | 08-320444 | 12/1996 |

* cited by examiner

*Primary Examiner*—Euncha P. Cherry
(74) *Attorney, Agent, or Firm*—Roylance, Abrams, Berdo & Goodman, LLP

(57) ABSTRACT

A laser scanning unit is provided which can use an inexpensive and easily manufactured fθ lens and which can further ensure good precision in adjustment. The laser scanning unit can repeatedly scan focused light onto a scan line, and includes a multi-beam light source for emitting parallel light, first and second cylindrical lenses for focusing the parallel light in a sub-scanning direction and a main scanning direction, respectively, a polygon mirror for deflecting the focused light in the main scanning direction, and an fθ lens for focusing the deflected light on the scan line.

12 Claims, 6 Drawing Sheets

LASER SCANNING UNIT

BACKGROUND OF THE INVENTION

This application claims the benefit under 35 U.S.C. §119 (a) of Japanese Patent Application No. 2004-093258, filed in the Japanese Intellectual Property Office on Mar. 26, 2004, and of Korean Patent Application No. 10-2004-0075971, filed in the Korean Intellectual Property Office on Sep. 22, 2004, the entire disclosures of each of which are hereby incorporated by reference.

1. Field of the Invention

The present invention relates to a laser scanning unit. More particularly, the present invention relates to a laser scanning unit that is applied to a tandem color image forming system or the like, and which deflects a plurality of laser beams using one light deflecting means, separates optical paths of the deflected laser beams, and radiates the separated laser beams on a plurality of exposed media.

2. Description of the Related Art

Laser scanning units are typically used in image forming systems, such as printers or digital copiers, to scan laser beams deflected by light deflecting means onto the image forming optical systems using a singlet plastic fθ lens.

Such a laser scanning unit, which can make incident light parallel in a main scanning direction to easily dispose a light source in front of light deflecting means, is disclosed in Japanese Patent Publication No. 2621838 (see FIG. 1), the entire disclosure of which is hereby incorporated by reference.

The laser scanning unit is constructed such that light radiated from a semiconductor laser is collimated into a parallel beam by a collimating lens, and the parallel beam is focused only in a sub-scanning direction, which is a rotational direction, by a cylindrical lens. The focused parallel beam is then imaged on a position at a rotating polygonal deflector or a polygon mirror used as a light deflecting means, and the light is scanned at a constant speed by a singlet scanning lens in an axial direction of a photosensitive drum.

Further, a laser scanning unit, which can reduce a magnifying power necessary for a singlet plastic fθ lens by radiating focused light from a light source and thereby make the singlet plastic fθ lens more easily manufactured, is disclosed in Japanese Patent Laid-Open Publication No. hei 7-111501 (see FIGS. 1, 3, and 4), the entire disclosure of which is hereby incorporated by reference.

The laser scanning unit includes a first optical scanning system, which focuses light radiated from the light source and emits the focused light to a deflection point formed on a deflecting surface of light deflecting means, and a second optical scanning system, which has an fθ lens made of a single lens. Accordingly, if the thin fθ lens is made of plastic, it can be easily manufactured and mass produced at lower costs.

However, the two conventional laser scanning units have the following drawbacks. Since the former laser scanning unit obtains a magnifying power necessary for image formation in the main scanning direction using only the singlet scanning lens, the magnifying power of the scanning lens needs to be increased. Consequently, the scanning lens has a non-uniform shape, which is thick in the middle compared to its edges, thereby increasing a possibility of internal deformation during a lens forming process.

Since the latter laser scanning unit causes the focused laser beam to be incident on the fθ lens, the laser scanning unit is superior in lens forming efficiency to the former laser scanning unit. However, if an optical path from the light source to the photosensitive drum is extended, magnifying power increases such that the light source unit is required to satisfy a higher assembly precision, and assembly productivity decreases. Also, since an outer diameter of the collimating lens needs to increase, associated costs also increase, and changes in product performance due to changes in environmental conditions, including temperature increases.

An optical scanning system, which can be produced inexpensively by commonly using only one expensive deflector for four laser beams, is used for conventional tandem color printers. In this case however, both an optical path synthesizing unit for synthesizing optical paths of the four laser beams and an optical path separating unit for separating the four optical paths are necessary, thereby, increasing the entire optical path length. Accordingly, such an optical scanning system is difficult to be applied to the latter laser scanning unit.

Accordingly, a need exists for a system and method for a laser scanning unit that can be provided with reduced assembly precision requirements, and also minimize changes in performance due to changes in environmental conditions, including temperature increases.

SUMMARY OF THE INVENTION

The present invention provides a laser scanning unit which can use an inexpensive and easily manufactured fθ lens and can further ensure good precision in adjustment.

According to an aspect of the present invention, a laser scanning unit is provided which repeatedly scans focused light onto a scan line, the laser scanning unit comprising a light source for emitting parallel light, first and second light focusing elements for focusing the parallel light in a sub-scanning direction and a main scanning direction, respectively, light deflecting means for deflecting the focused light in the main scanning direction, and a singlet plastic fθ lens for focusing the deflected light on the scan line. Since the parallel light is focused in the main scanning direction, a magnifying power necessary for the singlet plastic fθ lens decreases, and thus, the singlet plastic lens can have a uniform shape. Accordingly, the lens forming efficiency of the laser scanning unit according to an embodiment of the present invention is superior to that of a conventional unit having a non-uniform lens.

Further, since a magnifying power of the optical system is reduced, good adjustment precision of an object can be ensured, and assembly productivity can be improved.

Furthermore, since the first and second light focusing elements independently focus the light in the sub-scanning direction and the main scanning direction, respectively, a focal point in the sub or main scanning direction can be easily adjusted.

In the following description, the sub-scanning direction and the main scanning direction are used in a broad sense as known by those skilled in the art.

That is, the sub-scanning direction may be a direction orthogonal to a scan line over a recording medium to be scanned, or a direction orthogonal to a direction of an optical path and thus, orthogonal to the scan line when reaching the scan line along the optical path.

The main scanning direction may be a direction of the scan line, a direction orthogonal to the sub-scanning direction among directions orthogonal to the direction of the optical path, or a direction orthogonal to an optical axis of the optical system within a flat surface on which the laser beam is deflected.

The first light focusing element may be comprised of a glass lens and the second light focusing element may be comprised of a plastic lens.

Embodiments of the present invention can reduce costs by using the plastic lens as the second light focusing element.

The light source may comprise a semiconductor laser, a collimating lens, and a support member for supporting the semiconductor laser and the collimating lens, wherein the sum of a focal point variation caused by a wavelength change of the semiconductor laser during a temperature change, a focal point variation caused by a thermal shrinkage of the support member, a focal point variation caused by a focal length change of the second light focusing element, and a focal point variation caused by a focal length change of the singlet plastic fθ lens, is within ±2 mm. Although a spot diameter of the laser scanning unit used in a conventional printer is usually 60 to 70 μm, if the sum of the focal point variations is within ±2 mm, a spot diameter change on a photosensitive body is within a depth of focus, thereby minimally affecting the performance of the laser scanning unit.

A plurality of light sources and a plurality of first and second light focusing elements may be installed with respect to one light deflecting means, such that a plurality of laser beams are simultaneously scanned on different scan lines.

Since the plurality of light sources and the plurality of first and second light focusing elements are installed with respect one light deflecting means, a small and inexpensive tandem scanning optical system can be realized.

BRIEF DESCRIPTION OF THE DRAWINGS

The above and other features and advantages of the present invention will become more apparent by describing in detail exemplary embodiments thereof with reference to the attached drawings, in which.

Throughout the drawings, like reference numerals will be understood to refer to like parts, components and structures.

DETAILED DESCRIPTION OF EXEMPLARY EMBODIMENTS

Figure 1:
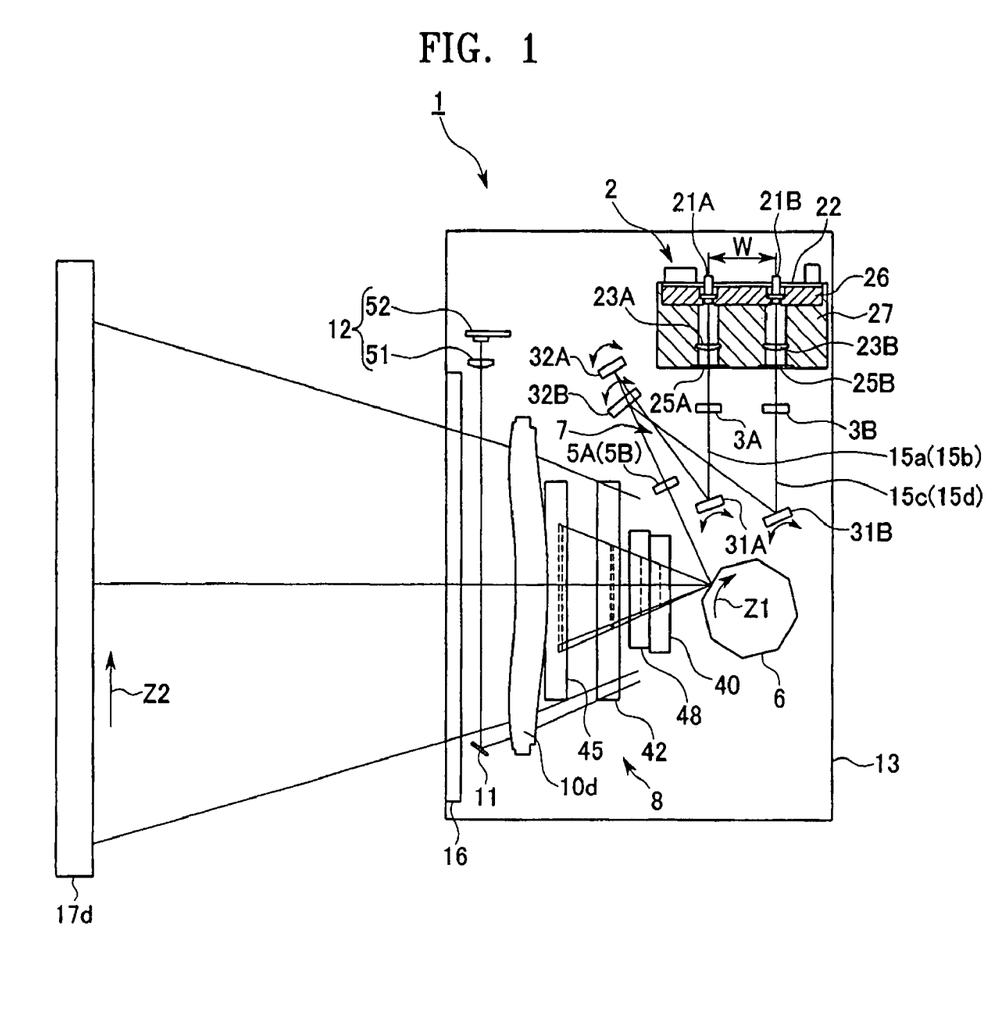
FIG. 1 is a schematic plan view of a laser scanning unit according to an embodiment of the present invention.
Figure 2A:
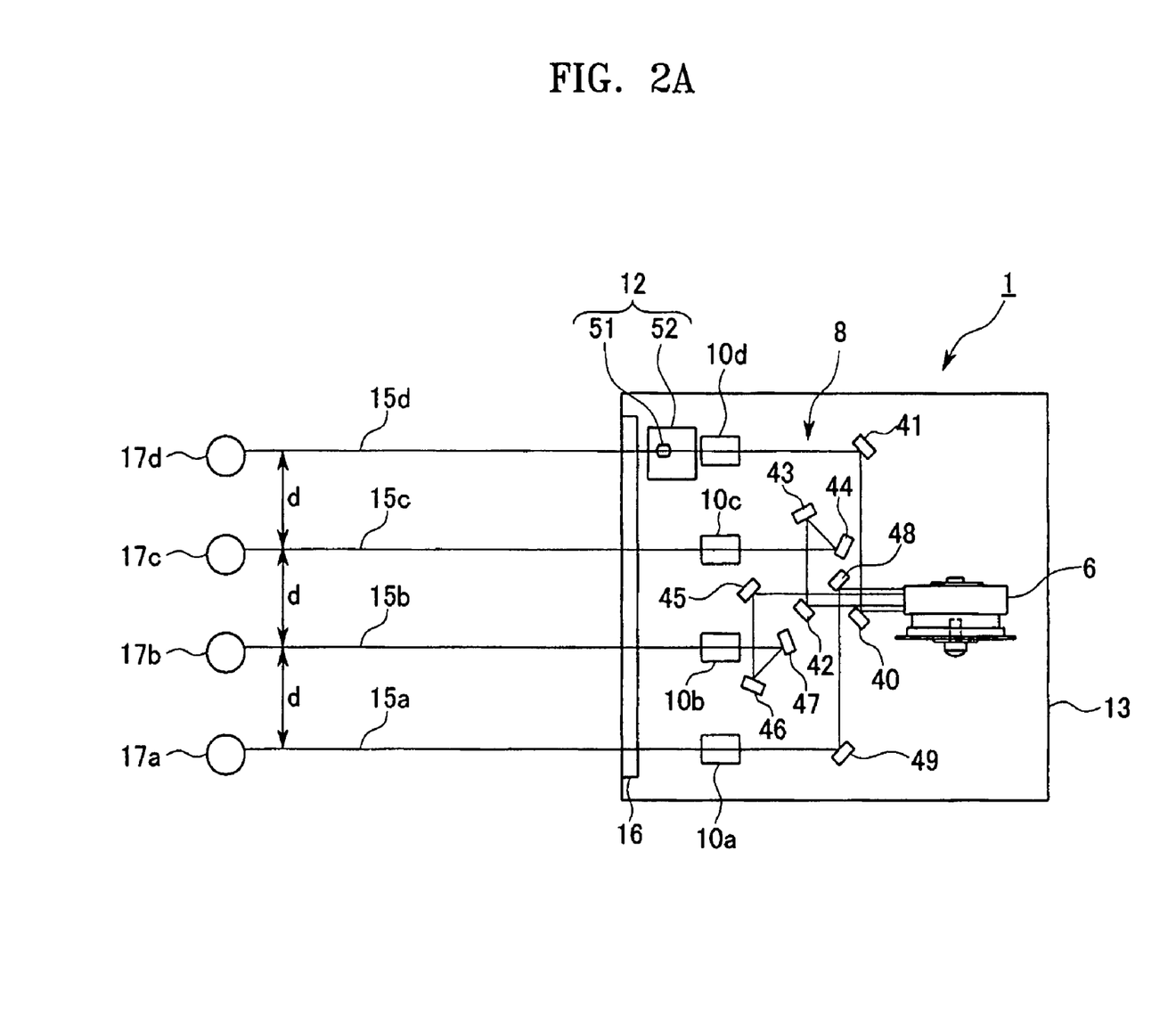
FIG. 2A is a front view of the laser scanning unit shown in FIG. 1.
Figure 2B:
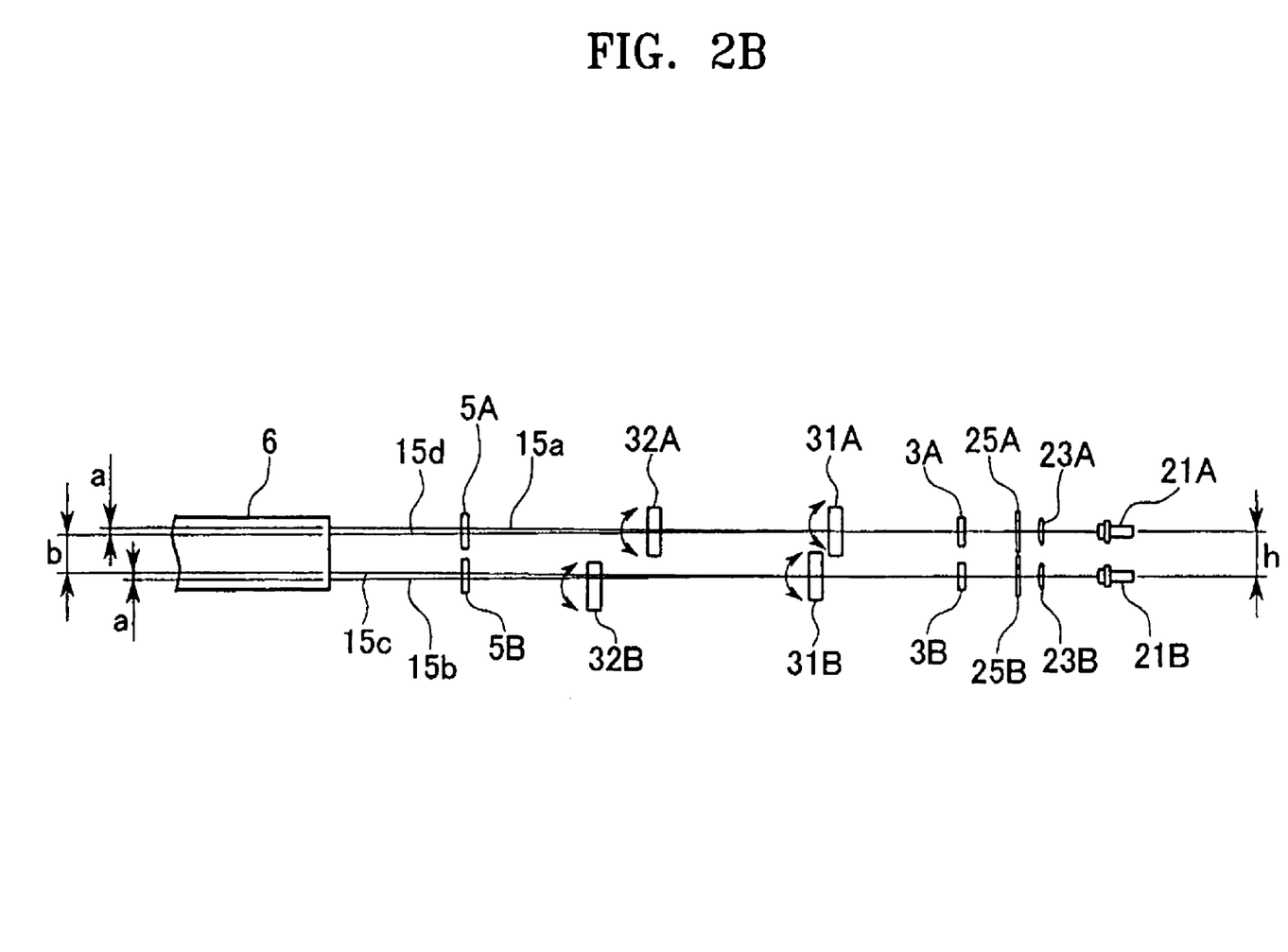
FIG. 2B is a partial view of an optical path at a section in a sub-scanning direction of the laser scanning unit shown in FIG. 1.

An exemplary embodiment of a laser scanning unit according to the present invention will now be explained with reference to FIGS. 1, 2A and 2B. Here, FIG. 1 is a schematic plan view of the laser scanning unit according to an embodiment of the present invention. FIG. 2A is a front view of the laser scanning unit shown in FIG. 1, and FIG. 2B is a sectional view of an optical path at a section in a sub-scanning direction of the laser scanning unit shown in FIG. 1.

A laser scanning unit 1 comprises a laser scanning optical system that can be used in a tandem color printer. The laser scanning unit 1 images a plurality of laser beams as beams with a predetermined spot diameter on different scan lines, and repeatedly scans the plurality of laser beams.

The laser scanning unit 1 includes a multi-beam light source 2 for radiating parallel light, first cylindrical lenses (first light focusing elements) 3A and 3B for imaging the light incident from the multi-beam light source 2 in a sub-scanning direction, second cylindrical lenses (second light focusing elements) 5A and 5B for imaging light emitted from the first cylindrical lenses 3A and 3B in a main scanning direction, optical path changing means 7 disposed between the first cylindrical lenses 3A and 3B and the second cylindrical lenses 5A and 5b for directing the repeatedly emitted light from the first cylindrical lenses 3A and 3B to a polygon mirror (light deflecting means) 6, an optical path separating optical system 8 for separating light emitted from the polygon mirror 6, singlet plastic fθ lenses (hereinafter referred to as fθ lenses) 10a through 10d, a return mirror 11, and a synchronization sensor unit 12. All the components are arranged inside a case 13.

Laser beams 15a through 15d are radiated from laser diode (LD) arrays (semiconductor laser arrays) 21A and 21B, which are described in greater detail below, and are emitted through a protective glass 16 installed on the case 13. The beams 15a through 15d are then emitted to photosensitive drums 17a through 17d, on which an electrostatic latent image developed using yellow, magenta, cyan, and black toners in a full color image forming system (not shown) is formed.

The multi-beam light source 2 includes the LD arrays 21A and 21B, an LD driving circuit substrate 22 for driving the LD arrays 21A and 21B, two collimating lenses 23A and 23B, irises 25A and 25B, and a support member 27 for supporting the LD arrays 21A and 21B, the LD driving circuit substrate 22, the collimating lenses 23A and 23B, and the irises 25A and 25B. The LD arrays 21A and 21B comprise two-beam LD array elements, and each of the LD arrays 21A and 21B has two light emitting units spaced a distance h from each other in the sub-scanning direction. The light emitting units radiate laser beams 15a and 15b, and laser beams 15c and 15d, respectively. The LD arrays 21A and 21B are mounted on a base 26 and are spaced a distance W from each other in the main scanning direction.

The distance W is large enough to secure spaces for the LD arrays 21A and 21B, and also prevent the LD arrays 21A and 21B from being thermally affected by each other.

Further, when the laser scanning unit 1 is applied to a full color image forming system according to an embodiment of the present embodiment, the distance h is preferably as narrow as possible considering the spaces that are required for the respective components, the size of reflective surfaces of the polygon mirror 6, and so on. For example, when the laser scanning unit 1 is used to scan multi beams, a pitch between scan lines in the sub-scanning direction needs to be an exact value, therefore the distance h is determined based on a magnifying power of the optical system in the sub-scanning direction so that the pitch of the scan lines in the sub-scanning direction can be the same as a desirable print-density.

The base 26 is a metal plate made of material with a high thermal conductivity, such that the LD arrays 21A and 21B smoothly radiate heat and the lifetime of the LD arrays 21A and 21B is maximised. Since uniform temperature is maintained, a wavelength change due to a temperature change is prevented, even though the amount of light emitted from the LD arrays 21A and 21B can be different from each other. Thus, a magnifying power difference due to a chromatic aberration by which scan areas of the respective laser beams are varied does not occur. As a result, image quality deterioration is prevented when the laser scanning unit is applied to an image forming system.

The LD driving circuit substrate 22 is electrically connected to the LD arrays 21A and 21B, and supports a driving circuit for modulating the light emitting units of the LD arrays 21A and 21B based on an external modulation signal.

The collimating lenses 23A and 23B are lenses, or a group of lenses, that are disposed in front of the light emitting units of the LD arrays 21A and 21B, and change the laser beams 15a through 15d radiated from the LD arrays 21A and 21B into parallel beams. The irises 25A and 25B act as light controlling members for causing the parallel laser beams emitted from the collimating lenses 23A and 23B to have a predetermined diameter. The irises 25A and 25B are comprised of metal plates, each having a substantially oval opening extending in the main scanning direction.

The support member 27 on which the LD arrays 21A and 21B, the LD driving circuit substrate 22, the collimating lenses 23A and 23B, and the irises 25A and 25B are mounted, is detachably installed on the case 13. Positions among the LD arrays 21A and 21B, the LD driving circuit substrate 22, the collimating lenses 23A and 23B, and the irises 25a and 25B may be adjusted if necessary. Accordingly, when the support member 27 is mounted on a mount surface (not shown) that is installed on the case 13 in a highly precise manner, the four parallel laser beams with the predetermined diameter can be emitted to predetermined positions in predetermined directions. The light source unit can also be easily exchanged with another light source unit without adjustment. The support member 27 is further provided such that a focal point difference during a temperature change of the support member 27 is different in direction from a focal point difference during a temperature change of the second cylindrical lenses 5A and 5B and the fθ lenses 10a through 10d.

Also, the support member 27 may be made of the same material as the base 26 to reduce the number of components.

The first cylindrical lenses 3A and 3B are comprised of glass lenses having a magnifying power only in the sub-scanning direction. The first cylindrical lenses 3A and 3B are optical elements that image in the sub-scanning direction the laser beams 15a through 15d that are radiated from the multi-beam light source 2, and change the respective beams into substantially linear beams extending in the main scanning direction.

The second cylindrical lenses 5A and 5B are comprised of plastic lenses having a magnifying power only in the main scanning direction. The second cylindrical lenses 5A and 5B are optical elements that focus the laser beams 15a through 15d in the main scanning direction, and change the focused laser beams into spot laser beams.

The polygon mirror 6 deflects the laser beams 15a through 15d to image forming positions in the main scanning direction. The polygon mirror 6 is comprised of a rotating polygonal mirror, for example, an octagonal mirror, within a flat surface (referred to as a beam scanned surface) orthogonal to the sub-scanning direction. The polygon mirror 6 is rotated at a constant angular speed in a direction indicated by arrow Z1 shown in FIG. 1 by a motor (not shown) that receives an external driving signal and rotates at a predetermined speed. The laser beams 15a through 15d whose width in the sub-scanning direction is exaggerated in FIG. 2, become substantially linear spot beams extending in the main scanning direction. Pitches in the sub-scanning direction are distances a, b, and c, wherein the sum of distances a and b equal the distance h between the two light emitting units (that is, a+b=h).

The optical path changing means 7 includes first adjustment mirrors 31A and 31B, and second adjustment mirrors 32A and 32B.

The first adjustment mirrors 31A and 31B, and the second adjustment mirrors 32A and 32B, each reflect the laser beams 15a through 15d passing through the first cylindrical lenses 3A and 3B at mirror surfaces to fold the laser beams 15a through 15d in the form of a "Z" within the flat surface in the main scanning direction. Each of the first adjustment mirrors 31A and 31B, and the second adjustment mirrors 32A and 32B, includes biaxial tilt angle adjustment means (not shown) with a combination of elastic pressure means and an adjusting screw that presses a mirror body. Positions of the respective mirror surfaces are variable.

In an embodiment of the present embodiment, the two axes are a pivotal axis in the sub-scanning direction and a pivotal axis in the main scanning direction orthogonal to the sub-scanning direction, and respective pivotal centers are formed on the optical axes of the optical system.

The first adjustment mirror 31A and the second adjustment mirror 32A, and the first adjustment mirror 31B and the second adjustment mirror 32B, are disposed so that they arrange axial chief rays from the first cylindrical lenses 3A and 3B toward image forming positions onto planes along the sub-scanning direction between the second adjustment mirrors 32A and 32B and the image forming positions at their neutral positions, such that the axial chief rays are parallel to each other.

The optical path separating system 8 is an optical system that separates optical paths of the laser beams 15a through 15d changed by the polygon mirror 6, and finally scans the laser beams 15a through 15d with uniform pitches d between each onto drums 17a through 17d. The optical path separating system 8 includes separating reflective mirrors 40 through 49 installed at 10 places. Each of the separating reflective mirrors 40 through 49 extends a predetermined length in the main scanning direction, and has a surface-reflecting mirror with a tilt angle relative to the sub-scanning direction.

The separating reflective mirror 40 returns the laser beam 15d almost toward the sub-scanning direction, and guides the laser beam 15d to the separating reflective mirror 41 that is almost parallel to the separating reflective mirror 40. The separating reflective mirror 41 is disposed such that the laser beam 15d is scanned within a flat surface orthogonal to the sub-scanning direction.

The separating reflective mirror 42 returns the laser beam 15c almost toward the sub-scanning direction, and guides the laser beam 15c to the separating reflective mirrors 43 and 44 that are disposed to fold an optical path substantially in the form of a triangle at a section in the sub-scanning direction. The laser beam 15c is scanned within a flat surface parallel to the laser beam 15d by the separating reflective mirrors 43 and 44. The separating reflective mirror 45 returns the laser beam 15b almost toward the sub-scanning direction, and guides the laser beam 15b to the separating reflective mirrors 46 and 47 that are disposed to fold an optical path substantially in the form of a triangle at a section in the sub-scanning direction. The laser beam 15b is scanned within a flat surface parallel to the laser beams 15c and 15d by the separating reflective mirrors 46 and 47.

The separating reflective mirror 48 returns the laser beam 15a almost toward the sub-scanning direction, and guides the laser beam 15a to the separating reflective mirror 49 that is disposed almost in parallel to the separating reflective mirror 48. The laser beam 15a is scanned within a flat surface parallel to the laser beams 15b through 15d by the separating reflective mirror 49.

The separating reflective mirrors 40, 42, 45, and 48 are disposed so that they do not superimpose the axial direction and the sub-scanning direction, such that the separating reflective mirrors 40, 42, 45, and 48 can separate the optical paths of the simultaneously radiated laser beams 15a through 15d without invading the optical paths. If the pitches of the laser beams 15a through 15d in the sub-scanning direction are too narrow and the laser beams 15a through 15d cannot be separated, the LD arrays 21A and 21B are rotated to obtain a predetermined pitch.

The fθ lenses 10a through 10d are comprised of singlet plastic lenses. The fθ lenses 10a through 10d are lenses or a group of lenses having fθ properties for imaging the laser beams 15a through 15d, which are scanned within the flat surfaces parallel to one another by the optical path separating optical system 8, into laser beams with predetermined diameters at scan line positions over the photosensitive drums 17a through 17d. Accordingly, a scanning speed in the main scanning direction can be almost constant.

In the sub-scanning direction, an image forming position of the fθ lens 10 and an image forming position of the first cylindrical lenses 3A and 3B and second cylindrical lenses 5A and 5B are in a conjugate relation. Since a difference of scan line in the sub-scanning direction due to a surface slope of the polygon mirror 6 is significantly low, an optical system that is capable of correcting a surface slope is realized.

The return mirror 11 is comprised of an optical element that bends laser beams on a scanning starting side of a non-image forming area, from among the laser beams 15a through 15d changed by the polygon mirror 6, in a direction intersecting the optical axis, to guide the bent laser beams to the synchronization sensor unit 12.

The synchronization sensor unit 12 includes a synchronization detecting lens 51, which focuses light in a proper shape and improves a signal to noise (S/N) ratio, and a horizontal synchronization sensor 52, which detects the light focused by the synchronization detecting lens 51. The horizontal synchronization sensor 52 may include a light sensor having a light response, such as a PIN photo diode. An electrical circuit that signalises a light detection output timing is connected to the horizontal synchronization sensor 52, such that a horizontal synchronization signal can be output to the outside of the laser scanning unit 1. Further, the electrical circuit may be integrated to be integrally formed in the vicinity of the horizontal synchronization sensor 52.

An operation of the exemplary laser scanning unit 1 constructed as described above according to an embodiment of the present embodiment will now be described in greater detail.

An external driving signal for driving the polygon mirror 6 is input to rotate the polygon mirror 6 at a constant speed. The laser beam 15d is turned on by providing a direct current (DC) to at least the LD array 21B.

After the laser beam 15d is emitted from the LD array 21B, the laser beam 15d passes through the collimating lens 23B and the iris 25B to become parallel light with a predetermined diameter, and then incident on the first cylindrical lens 3B.

The laser beam 15d incident on the first cylindrical lens 3B is focused in the sub-scanning direction by the first cylindrical lens 3B, and is returned in the form of a "Z" by the first adjustment mirror 31B and the second adjustment mirror 32B to then be incident on the second cylindrical lens 5B. The laser beam 15d incident on the second cylindrical lens 5B is focused in the main scanning direction by the second cylindrical lens 5B, and is imaged in the sub-scanning direction toward a first reflective surface of the polygon mirror 6. The laser beam 15d then changes into substantially linear light extending in the main scanning direction. Thereafter, the laser beam 15d is deflected in the main scanning direction by the polygon mirror 6.

The laser beam 15d that is deflected by the polygon mirror 6 is folded by the separating reflective mirrors 40 and 41 to be incident on the fθ lens 10d. The laser beam 15d incident on the fθ lens 10d is imaged on a scan line of the photosensitive drum 17d through an image forming operation. A deflection angle is increased at a constant speed and the laser beam 10d is scanned at a constant speed in a direction indicated by arrow Z2 shown in FIG. 1 on the scan line due to the fθ properties of the fθ lens 10d.

The laser beam 15d is returned by the return mirror 11 on the scanning starting side to be incident on the synchronization sensor unit 12. When the laser beam 15d reaches a predetermined position, the synchronization sensor unit 12 outputs a horizontal synchronization signal and, at the same time, temporarily turns off the laser beam 15d. After a predetermined period of time, a modulation signal for modulating the LD array 21B is input from the horizontal synchronization signal, such that the laser beam 15d is modulated according to the modulation signal.

If a deflection scanning by the first reflective surface of the polygon mirror 6 ends in this way, the same scanning is performed on a next reflective surface of the polygon mirror 6, and the laser beam 15d modulated according to an image signal is repeatedly scanned on the scan line. While this is occurring, the photosensitive drum 17d rotates in the sub-scanning direction at a constant linear speed. Accordingly, the laser beam 15d is scanned two-dimensionally over the photosensitive drum 17d to form a latent image on the photosensitive drum 17d. If the image forming system is in a black printing mode, a monochrome image is formed.

The laser beams 15a through 15c may be scanned over the photosensitive drums 17a through 17c in substantially the same manner as the laser beam 15d to the point of separation of the optical paths at the optical path separating system 8.

Since, at a point right before being incident on the reflective surfaces of the polygon mirror 6, the optical paths of the laser beams 15a through 15c are arranged in parallel to the flat surface in the sub-scanning direction by the first adjustment mirrors 31A and 31b and the second adjustment mirrors 32A and 32B, incident angles on the polygon mirror 6 are substantially the same, and scan angles relative to the fθ lenses 10a through 10d are substantially the same. As a result, the laser beams 15a through 15c have almost the same scanning characteristics and effective scanning areas as one another, except for differences caused by an error in manufacture, arrangement, or the like, of the optical path separating system 8, the fθ lenses 10a through 10d, and so forth.

Since the laser beams 15a through 15c are almost synchronously scanned, when a full color image is output, read timings of the laser beams 15a through 15c can be exactly determined based on the horizontal synchronization signal of the laser beam 15d. That is, although delay times of read starting signals are the same, an error of the reflective surface of the polygon mirror due to a separation precision is common among the laser beams 15a through 15d. Consequently, depending on the optical path separating system 8, the fθ lenses 10 through 10d, and so on, the scanning unit suffers only a positional difference of the optical path separating system 8, the fθ lenses 10 through 10d, and so on. Embodiments of the present invention can easily correct the positional difference by finely adjusting the delay times of the read starting signals according to the laser beams 15a through 15d.

According to the exemplary laser scanning unit 1 constructed as described above, the second cylindrical lenses 5A and 5B that have a magnifying power in the main scanning direction and focus the laser beams 15a through 15d radiated from the LD arrays 21A and 21B in the main scanning direction, are installed between the multi-beam light source 2 and the polygon mirror 6, thereby reducing the magnifying power of the fθ lenses 10a through 10d. Accordingly, the fθ lenses 10a through 10d can have shapes with uniform thickness, thereby allowing a simple lens forming process to be used, and further reducing costs.

Further, since the second cylindrical lenses 5A and 5B are installed between the multi-beam light source 2 and the polygon mirror 6, the magnifying power of the optical system in the main scanning direction is small, thereby increasing an error tolerance in adjustment or manufacture of the scanning unit.

Since the first cylindrical lenses 3A and 3B, and the second cylindrical lenses 5A and 5B, independently image the light in the sub-scanning direction and the light in the main scanning direction, respectively, focal point positions in the main scanning direction and the sub-scanning direction can be independently adjusted.

Also, since a focal point variation of the support member 27 during a temperature change, and a focal point variation of the second cylindrical lenses 5A and 5B and the fθ lenses 10a through 10d, are different in direction, performance changes that can occur during a change in environmental conditions, including temperature, can be suppressed.

The present invention is not limited to the above exemplary embodiments, but various changes can be made therein without departing from the spirit and scope of the present invention.

For example, the laser scanning unit 1 can be applied to a full color image forming system to scan multi beams by color, or scan two beams per color using eight light sources.

An example focal point variation that can occur during a temperature change of the laser scanning unit 1 will now be described in greater detail with reference to the following data using FIG. 3. Here, FIG. 3 is a view of an optical path in the main scanning direction of the laser scanning unit 1 according to an embodiment of the present invention.

Figure 3:
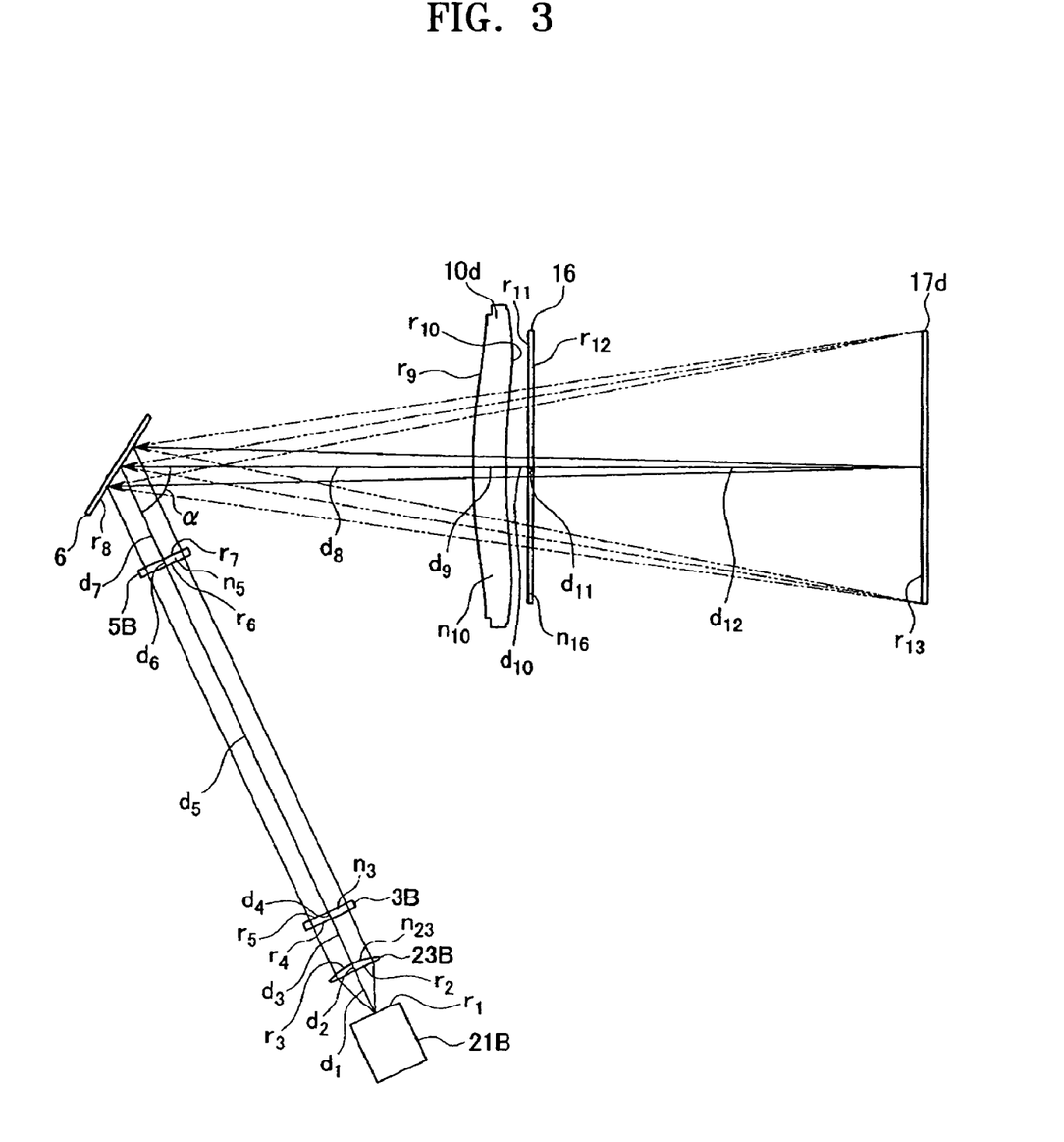
FIG. 3 is a view of an optical path in a main scanning direction of the laser scanning unit shown in FIG. 1.

The following data of Table 1 shows exemplary parameters defining the optical system of FIG. 3. The values $r_i$ and $n_i$ (wherein i=integer) respectively correspond to $r_i$ and $n_i$ of the parameters defining the optical system. Further, a surface distance is obtained at a temperature of 25° C., and a refractive index is obtained at a wavelength of 783 nm. The sum a of an angle of incidence and an angle of reflection in the polygon mirror 6 is 65°.

TABLE 1

| Surface No. | Radius of Curvature [mm] | Distance [mm] | Refractive Ratio |
|---|---|---|---|
| 1 | $r_1 = \infty$ (Light source) | | |
| 2 | $r_2 = 265$ | $d_1 = 18.87$ | |
| 3 | Aspherical surface [1] ($r_3$) | $d_2 = 2$ | $n_{23} = 1.576$ |
| 4 | Main scanning direction $r_{4a} = \infty$ (Flat surface) Sub-scanning direction $r_{4b} = 103$ | $d_3 = 22$ | |
| 5 | $r_5 = \infty$ (Flat surface) | $d_4 = 3$ | $n_3 = 1.511$ |
| 6 | Main scanning direction $r_{6a} = 211$ Sub-scanning direction $r_{6b} = \infty$ (Flat surface) | $d_5 = 157$ | |
| 7 | $r_7 = \infty$ (Flat surface) | $d_6 = 3$ | $n_5 = 1.503$ |
| 8 | $r_8 = \infty$ (Flat surface) | $d_7 = 40.48$ | |
| 9 | Aspherical surface [2] ($r_9$) | $d_8 = 144.52$ | |
| 10 | Aspherical surface [3] ($r_{10}$) | $d_9 = 15$ | $n_{10} = 1.503$ |
| 11 | $r_{11} = \infty$ (Flat surface) | $d_{10} = 8$ | |
| 12 | $r_{12} = \infty$ (Flat surface) | $d_{11} = 2$ | $n_{16} = 1.511$ |
| 13 | $\infty$ (Top surface) ($r_{13}$) | $d_{12} = 156$ | |

A co-ordinate system and equations for representing a rotating symmetrical aspherical surface in the exemplary embodiment of the present embodiment will now be described in greater detail.

The co-ordinate system is a right orthogonal coordinate system having the X-axis as the sub-scanning direction, the Y-axis as the main scanning direction, and the Z-axis as the optical axis that counts a light direction as a positive direction.

An aspherical light emitting surface 3 of the collimating lens 23B is defined by Equation (1) below.

$$Z = \frac{Cr^2}{1 + \sqrt{1 - (k+1)}} + ar^4 + br^6 + cr^8 + dr^{10} \qquad (1)$$

wherein C is an inverse number of a radius of curvature, k is a conic integer, r is the square root of the sum of $x^2$ and $y^2$, $$r = \sqrt{x^2 + y^2}$$

and a, b, c, and d are aspherical surface coefficients of the fourth, sixth, eighth, and tenth degrees, respectively.

Aspherical surfaces 9 and 10 of the fθ lens 10d through which light is incident and emitted, respectively, are defined by Equation (2) below.

$$Z = \frac{c_1 y^2}{1 + \sqrt{1 - (k+1)c_1^2 y^2}} + \sum A_m Y^m + \frac{x^2 c_2 (1 + \sum B_m Y^m)}{1 + \sqrt{1 + \{xc_2(1 + \sum B_m Y^m)\}^2}} \qquad (2)$$

wherein $c_1$ is an inverse number of a radius of curvature in the main scanning direction, $c_2$ is an inverse number of a radius of curvature in the sub-scanning direction, Y is the square root of $y^2$, $$Y = \sqrt{y^2}$$

and the variable, $$\Sigma A_m Y^m$$

is defined by Equation (3) below, $$\Sigma A_m Y^m = A_4 Y^4 + A_6 Y^6 + A_8 Y^8 + A_{10} Y^{10} + A_3 Y^3 + A_5 Y^5 + A_7 Y^7 + A_9 Y^9 \quad (3)$$

and further, the variable, $$\Sigma B_m Y^m$$

is defined by Equation (4) below.

$$\Sigma B_m Y^m = B_4 Y^4 + B_6 Y^6 + B_8 Y^8 + B_{10} Y^{10} + B_3 Y^3 + B_5 Y^5 + B_7 Y^7 + B_9 Y^9 \quad (4)$$

The following results can then be determined for aspherical surfaces 1, 2, and 3.

change of the LD array 21B during the temperature change, a distance change of a light emitting surface of the LD array 21B and the collimating lens 23B during the temperature change, a focal length change of the second cylindrical lens 5B during the temperature change, and a focal length change of the fθ lens 10d during the temperature change. Further, the variations of the respective components are shown in Table 2.

In addition, since the first cylindrical lens 3B is a glass lens, a focal length change of the first cylindrical lens 3B during the temperature change can be disregarded.

Aspherical surface [1]

Figure 4:
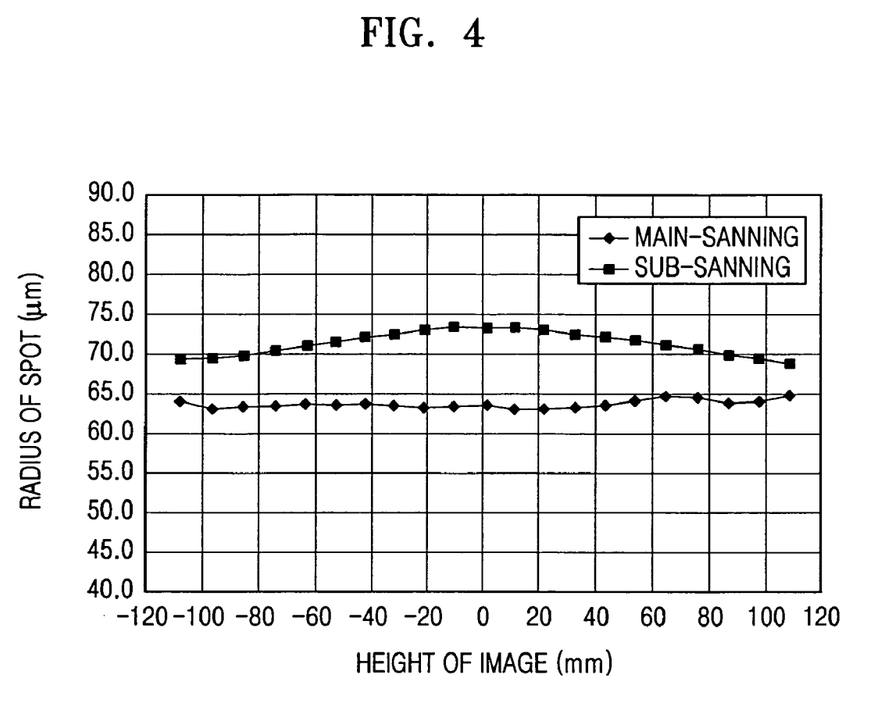
FIG. 4 is a graph illustrating spot diameter versus image height over a photosensitive drum of the laser scanning unit shown in FIG. 1.
Figure 5:
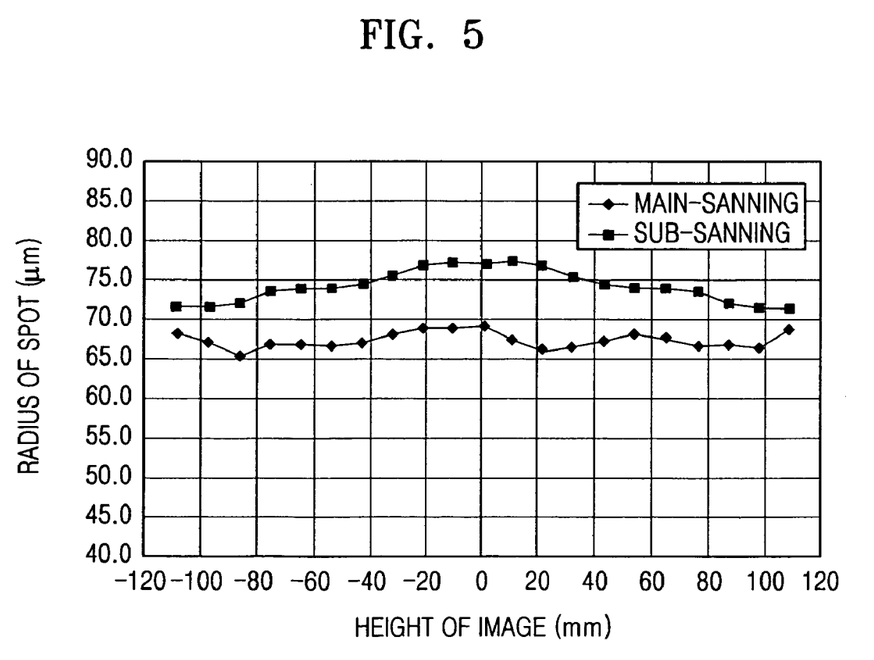
FIG. 5 is a graph illustrating spot diameter versus image height at a position that is +2 mm deviated from the photosensitive drum of the laser scanning unit shown in FIG. 1.
Figure 6:
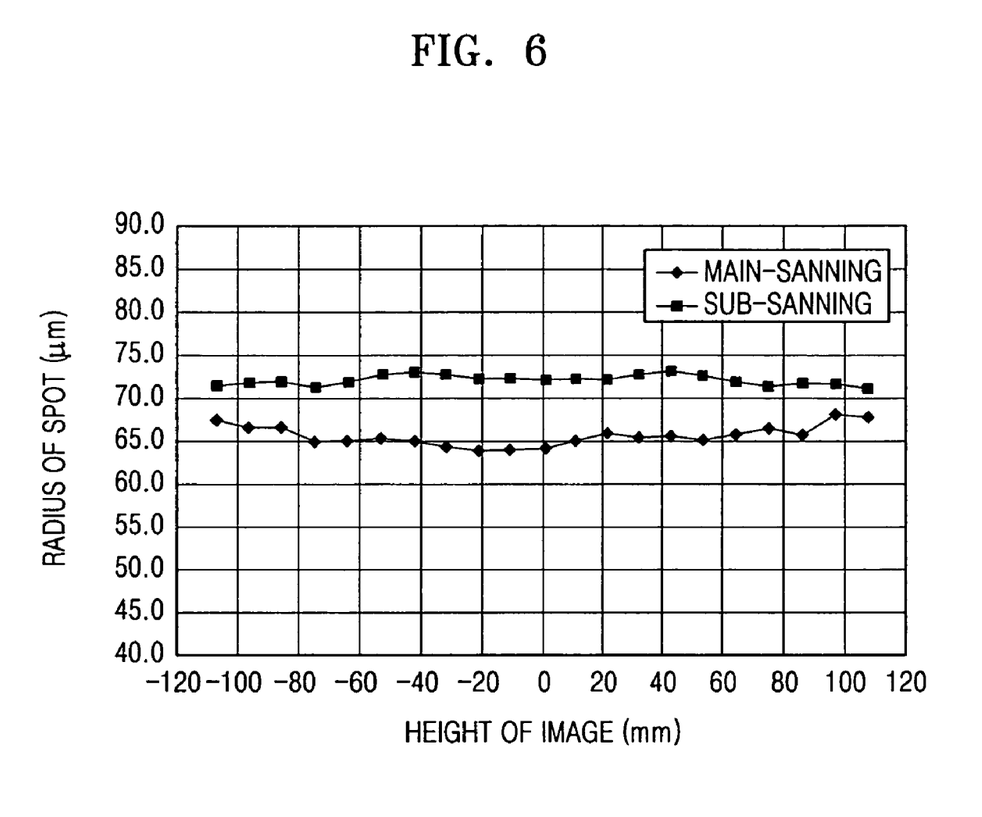
FIG. 6 is a graph illustrating spot diameter versus image height at a position that is −2 mm deviated from the photosensitive drum of the laser scanning unit shown in FIG. 1.

Radius of curvature  $r_3 = 12.075$
$k = -7.6722 \times 10^{-1}$
$a = 7.8967 \times 10^{-6}$   $b = 1.8077 \times 10^{-8}$   $c = -1.2414 \times 10^{-9}$   $d = 1.6923 \times 10^{-11}$ Aspherical surface [2]
Main scanning direction Radius of curvature  $r_{9a} = 160.449$
When $y > 0$
$k = 0$
$A_4 = -1.6004 \times 10^{-6}$   $A_6 = 1.6687 \times 10^{-9}$   $A_8 = -2.9158 \times 10^{-13}$   $A_{10} = -7.9890 \times 10^{-17}$
$A_3 = -6.9062 \times 10^{-7}$   $A_5 = 1.5387 \times 10^{-8}$   $A_7 = -3.5950 \times 10^{-11}$   $A_9 = 1.2314 \times 10^{-15}$
$B_4 = 0$   $B_6 = 0$   $B_8 = 0$   $B_{10} = 0$
$B_3 = 0$   $B_5 = 0$   $B_7 = 0$   $B_9 = 0$
When $y \leq 0$
$k = 0$
$A_4 = 3.4929 \times 10^{-7}$   $A_6 = 7.1298 \times 10^{-10}$   $A_8 = 2.1438 \times 10^{-13}$   $A_{10} = 3.0461 \times 10^{-18}$
$A_3 = -9.6570 \times 10^{-6}$   $A_5 = -2.6498 \times 10^{-8}$   $A_7 = -1.5641 \times 10^{-11}$   $A_9 = -1.4091 \times 10^{-15}$
$B_4 = 0$   $B_6 = 0$   $B_8 = 0$   $B_{10} = 0$
$B_3 = 0$   $B_5 = 0$   $B_7 = 0$   $B_9 = 0$ Sub-scanning direction Radius of curvature  $r_{9b} = -135.335$ Aspherical surface [3]
Main scanning direction Radius of curvature  $r_{10a} = 257$
When $y > 0$
$k = 0$
$A_4 = -1.5010 \times 10^{-6}$   $A_6 = 2.0157 \times 10^{-9}$   $A_8 = -2.0990 \times 10^{-13}$   $A_{10} = -6.8089 \times 10^{-17}$
$A_3 = -9.1236 \times 10^{-7}$   $A_5 = 4.4772 \times 10^{-9}$   $A_7 = -4.0528 \times 10^{-11}$   $A_9 = 1.0677 \times 10^{-14}$
$B_4 = 8.7154 \times 10^{-8}$   $B_6 = -3.0748 \times 10^{-10}$   $B_8 = 7.6960 \times 10^{-14}$   $B_{10} = 1.0350 \times 10^{-17}$
$B_3 = -3.8363 \times 10^{-6}$   $B_5 = 6.2140 \times 10^{-9}$   $B_7 = 2.8536 \times 10^{-12}$   $B_9 = -1.7861 \times 10^{-15}$
When $y \leq 0$
$k = 0$
$A_4 = 8.7154 \times 10^{-8}$   $A_6 = -3.0748 \times 10^{-10}$   $A_8 = 7.6960 \times 10^{-14}$   $A_{10} = 1.0350 \times 10^{-17}$
$A_3 = -3.8363 \times 10^{-5}$   $A_5 = 6.2140 \times 10^{-9}$   $A_7 = 2.8536 \times 10^{-12}$   $A_9 = -1.7861 \times 10^{-15}$
$B_4 = 8.6452 \times 10^{-8}$   $B_6 = -1.5609 \times 10^{-10}$   $B_8 = 8.6804 \times 10^{-14}$   $B_{10} = 7.3001 \times 10^{-18}$
$B_3 = -3.6210 \times 10^{6}$   $B_5 = 3.7587 \times 10^{-9}$   $B_7 = -2.2218 \times 10^{-13}$   $B_9 = -1.4269 \times 10^{-15}$ Sub-scanning direction Radius of curvature  $r_{10b} = -32.021$ The spot diameter versus image height over the photosensitive drum 17d is illustrated in FIG. 4, spot diameter versus image height at a position that is +2 mm deviated from the photosensitive drum 17d is illustrated in FIG. 5, and spot diameter versus image height at a position that is −2 mm deviated from the photosensitive drum 17d is illustrated in FIG. 6. In FIGS. 4, 5 and 6, the vertical axis represents the radius of the spot, and the horizontal axis represents the height of the image. It can be seen from the figures that a change in spot diameter is a sufficiently small value, less than 5 μm, when a focal point difference of ±2 mm occurs in FIGS. 4 through 6.

A focal point variation during a temperature change of the laser scanning unit 1 can be the result of a wavelength

TABLE 2

| Factor | Components | Variation |
|---|---|---|
| 1 | Wavelength of LD array | 783 nm → 791 nm |
| 2 | Distance between LD array and collimating lens | $d_1 \times \varDelta t \times \alpha$ |
| 3 | Focal length of second cylindrical lens | $-(f/(n-1))(dn/dt) \varDelta t + \alpha f \varDelta t$ |
| 4 | Focal length of f θ lens | $-(f/(n-1))(dn/dt) \varDelta t + \alpha f \varDelta t$ |

In Table 2, $d_1$ is a distance between a light emitting surface of the LD array 21B and the collimating lens 23B, f is a focal length, n is a refractive index, dn/dt is a temperature coefficient of the refractive index, Δt is a temperature change, and α is a thermal expansion coefficient. The first row of Table 2 represents a focal length variation of the cylindrical lens 5B and the fθ lens 10d with respect to a refractive index change, and the second row represents a focal length variation with respect to a shape change.

If a thermal expansion coefficient of the support member 27 is $3.7 \times 10^{-5}$, a distance change between the light emitting surface of the LD array 21B and the collimating lens 23B is $2.4 \times 10^{-2}$ [mm]. Data of the second cylindrical lens 5B in the main scanning direction, and data of the fθ lens 10d in the main scanning direction and in the sub-scanning direction are shown in Table 3.

TABLE 3

| | Second cylindrical lens (Main scanning direction) | F θ lens (Main scanning direction) | F θ lens (Sub-scanning direction) |
|---|---|---|---|
| Material | Plastic | Plastic | Plastic |
| f(25° C.)[mm] | 420 | 808 | 80 |
| n | 1.503 | 1.503 | 1.503 |
| dn/dt[1/° C.] | $-1.133 \times 10^{-4}$ | $-1.133 \times 10^{-4}$ | $-1.133 \times 10^{-4}$ |
| Δt[° C.] | 30 | 30 | 30 |
| α[1/° C.] | $9 \times 10^{-5}$ | $9 \times 10^{-5}$ | $9 \times 10^{-5}$ |
| f(55° C.)[mm] | 423.71 | 815.24 | 80.33 |

In Table 3, f(25° C.) is a focal length at a temperature of 25° C., and f(55° C.) is a focal length at a temperature of 55° C.

A focal point variation of the optical system due to a wavelength change of the LD array 21B, a focal point variation of the optical system due to a distance change of the light emitting surface of the LD array 21B and the collimating lens 23B, a focal point variation of the optical system due to a focal point change of the second cylindrical lens 5B, and a focal point variation of the whole optical system due to a focal point change of the fθ lens 10d, are each shown in Table 4 in the main scanning direction and the sub-scanning direction, respectively.

In the data, positive (+) data is in a forward direction of the Z-axis, which is the optical axis.

TABLE 4

| Factor | Main scanning direction Defocus [mm] | Sub-scanning direction Defocus [mm] |
|---|---|---|
| 1 | 1.7 | 0.8 |
| 2 | -5.6 | -2.3 |
| 3 | 2.3 | 0 |
| 4 | 0.3 | 3.0 |
| Total | -1.4 | 1.4 |

Accordingly, since the focal point variation of the fθ lens 10d during the temperature change is different in direction from the focal point variation of the multi-beam light source 2 during the temperature change, the focal point variations of the optical system in the main scanning direction and the sub-scanning direction during the temperature change of 25 to 55° C. are respectively within ±2.0 mm. Accordingly, the performance changes of the laser scanning unit are suppressed when environmental conditions vary is suppressed.

As described above, since the parallel light is independently focused in the main scanning direction, the magnifying power required for the singlet plastic fθ lens is reduced. Accordingly, the radius of curvature of the single length plastic lens can increase and the singlet plastic lens can have a uniform shape, thereby improving the lens forming process as compared with a non-uniform type.

Furthermore, the error tolerance in adjustment of the object can be increased by reducing the magnifying power of the optical system, and the optical system can be more easily assembled, thereby enhancing productivity.

Moreover, since the first and second light focusing elements independently focus laser beams in the sub-scanning direction and the main scanning direction, respectively, the focal point positions can be independently adjusted in the sub-scanning direction and the main scanning direction.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A laser scanning unit which can repeatedly scan focused light onto a scan line, the laser scanning unit comprising:
   a light source for emitting parallel light;
   first light focusing elements for focusing the parallel light only in a sub-scanning direction;
   second light focusing elements for focusing the parallel light only in a main scanning direction;
   an optical path changing means disposed between the first light focusing elements and the second light focusing elements for directing the focused light from the first light focusing elements to the second light focusing elements;
   light deflecting means for deflecting the focused light in the main scanning direction; and
   a singlet plastic fθ lens for focusing the deflected light on the scan line.

2. The laser scanning unit of claim 1, wherein the light source comprises:
   a semiconductor laser;
   a collimating lens; and
   a support member for supporting the semiconductor laser and the collimating lens, wherein a sum of a focal point variation caused by a wavelength change of the semiconductor laser during a temperature change, a focal point variation caused by a thermal shrinkage of the support member, a focal point variation caused by a focal length change of the second light focusing element, and a focal point variation caused by a focal length change of the singlet plastic fθ lens, is within a range of about ±2 mm.

3. The laser scanning unit of claim 1, further comprising:
   a plurality of light sources for providing a plurality of laser beams; and
   a plurality of light focusing elements, which are installed with respect to one light deflecting means such that the plurality of laser beams are simultaneously scanned on different scan lines.

4. The laser scanning unit of claim 1, wherein the first light focusing element comprises a glass lens, and the second light focusing element comprises a plastic lens.

5. The laser scanning unit of claim 4, wherein the light source comprises:
   a semiconductor laser;
   a collimating lens; and
   a support member for supporting the semiconductor laser and the collimating lens, wherein a sum of a focal point variation caused by a wavelength change of the semiconductor laser during a temperature change, a focal point variation caused by a thermal shrinkage of the support member, a focal point variation caused by a focal length change of the second light focusing element, and a focal point variation caused by a focal length change of the singlet plastic fθ lens, is within a range of about ±2 mm.

6. The laser scanning unit of claim 4, further comprising:
a plurality of light sources for providing a plurality of laser beams; and
a plurality of light focusing elements, which are installed with respect to one light deflecting means such that the plurality of laser beams are simultaneously scanned on different scan lines.

7. A method for controlling a thermal performance variation in a laser scanning unit, comprising the steps of:
controlling a focal point variation caused by a wavelength change of a semiconductor laser during a temperature change;
controlling a focal point variation caused by a thermal shrinkage of a support member for the semiconductor laser;
controlling a focal point variation caused by a focal length change of at least a first and second light focusing element; and
controlling a focal point variation caused by a focal length change of a singlet fθ lens, such that a sum of the focal point variation caused by a wavelength change of the semiconductor laser during a temperature change, the focal point variation caused by a thermal shrinkage of the support member, the focal point variation caused by a focal length change of the second light focusing element, and a focal point variation caused by a focal length change of the singlet fθ lens, is within a range of about ±2 mm.

8. The method for controlling a thermal performance variation in a laser scanning unit of claim 7, wherein the sum of the focal point variations is within a depth of focus, thereby minimally affecting the performance of the laser scanning unit.

9. The method for controlling a thermal performance variation in a laser scanning unit of claim 7, further comprising the step of focusing a parallel light in a main scanning direction such that a magnifying power necessary for the singlet fθ lens is decreased.

10. The method for controlling a thermal performance variation in a laser scanning unit of claim 9, wherein the singlet fθ lens can have a uniform shape thereby increasing lens forming efficiency of the laser scanning unit.

11. A laser scanning unit which can repeatedly scan focused light onto a scan line, the laser scanning unit comprising:
first and second light focusing elements for focusing parallel light in a sub-scanning direction and a main scanning direction, respectively;
light deflecting means for deflecting the focused light in the main scanning direction;
a singlet plastic fθ lens for focusing the deflected light on the scan line; and
a light source for emitting the parallel light, wherein the light source comprises a semiconductor laser, a collimating lens, and a support member for supporting the semiconductor laser and the collimating lens,
wherein a sum of a focal point variation caused by a wavelength change of the semiconductor laser during a temperature change, a focal point variation caused by a thermal shrinkage of the support member, a focal point variation caused by a focal length change of the second light focusing element, and a focal point variation caused by a focal length change of the singlet plastic fθ lens, is within a range of about ±2 mm.

12. A laser scanning unit which can repeatedly scan focused light onto a scan line, the laser scanning unit comprising:
first and second light focusing elements for focusing parallel light in a sub-scanning direction and a main scanning direction, respectively, wherein the first light focusing element comprises a glass lens, and the second light focusing element comprises a plastic lens;
light deflecting means for deflecting the focused light in the main scanning direction;
a singlet plastic fθ lens for focusing the deflected light on the scan line; and
a light source for emitting the parallel light, wherein the light source comprises a semiconductor laser, a collimating lens, and a support member for supporting the semiconductor laser and the collimating lens,
wherein a sum of a focal point variation caused by a wavelength change of the semiconductor laser during a temperature change, a focal point variation caused by a thermal shrinkage of the support member, a focal point variation caused by a focal length change of the second light focusing element, and a focal point variation caused by a focal length change of the singlet plastic fθ lens, is within a range of about ±2 mm.

* * * * *